Patented July 1, 1952

2,602,067

UNITED STATES PATENT OFFICE 2,602,067

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 5, 1950, Serial No. 183,292

10 Claims. (Cl. 252—342)

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities particularly inorganic salts from pipeline oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is a fractional ester obtained from a polycarboxy acid and a diol obtained by the oxypropylation of dihydroxylated ethers of glycerol with the proviso that the ether radical in turn be free from any group having 8 or more carbon atoms and is preferably obtained from a water-soluble aliphatic alcohol but may be obtained from an alicyclic alcohol such as cyclohexanol or from a phenol such as hydroxybenzene or cresol.

Glycerol ethers which are available for this type of synthesis are obtained by reacting a hydroxylated compound, such as an alcohol, phenol, or phenoxyalkanol, or the like, free from any radical having 8 carbon atoms or more, with propylene oxide so as to obtain a high molal alcohol ether and then subject such monohydric compound to reaction with glycide so as to give a diol in which both hydroxyl radicals are attached to two of the three adjacent terminal carbon atoms. Other reactions mentioned subsequently may be used. Reference is made to the fact that the initial monohydric reactant having less than 8 carbon atoms in any single radical is oxypropylated to yield a high molal ether alcohol. The expression "high molal" is employed to indicate a product having a molecular weight from 1,000 to several thousands, preferably within the range of 1,500 to 4,000 or even a more narrow range as stated subsequently. Suitable monohydric materials include the usual aliphatic alcohols, such as methyl alcohol, ethyl alcohol, propyl alcohol, butyl alcohol, allyl alcohol, hexyl alcohol, etc. Also there are included the phenols such as hydroxybenzene and cresol. Similarly, the hydrogenated derivatives of such phenols, i. e., the alicyclic alcohols, are included. Benzyl alcohol and hydrogenated benzyl alcohol may be used. Other alcohols which can be employed include tetrahydropyran-2-methanol and tetrahydrofurfuryl alcohol. My preference is to use aliphatic alcohols having at least 3 carbon atoms and preferably being water-soluble. This includes propyl alcohol, butyl alcohol, or amyl alcohol. In the case of butyl and amyl alcohols some of the isomers are water-soluble to the extent that they show solubility to the extent of a few percent at room temperature. Reference to the hydrocarbon group of such alcohols includes, of course, the derivatives of tetrahydropyran-2-methanol and tetrahydrofurfuryl alcohol even though there is an oxygen atom present. For the present purpose such radicals act as if they were entirely hydrocarbon in nature insofar that the presence of the oxygen atom contributes no objectionable property.

The oxypropylation, or for that matter the treatment of such monohydric compounds with any alkylene oxide and particularly ethylene oxide and propylene oxide, is well known. It is preferably conducted in the presence of an alkaline catalyst and a residual catalyst is preferably permitted to remain in the mass at the end of the reaction in order to catalyze subsequent treatment with glycide.

Briefly, then, a monohydric alcohol or other monohydric reactant having less than 8 carbon atoms in any single radical may be indicated thus: R′OH. Reacting such monohydric alcohol with propylene oxide the resultant ether alcohol may be indicated thus:

$$R'O(C_3H_6O)_nH$$

If for sake of simplicity the alcohol selected for oxypropylation is isopropyl alcohol the comparable derivative is indicated thus:

$$C_3H_7O(C_3H_6O)_nH$$

It has been pointed out previously that such monohydric ether alcohols must be of fairly high molecular weight and thus the value of $n$ in the two preceding formulas is within the range of approximately 15 to 80. My preference is that the molecular weight of the product at this stage, i. e., prior to treatment with glycide, be within the range of 2000 to 3000. Such ether alcohols can be obtained by other means which are well known. For instance, they are commercially available, polypropylene glycol having molecular weights within the range of 1,000 to 3,000, or even higher. Such products can, of course, be etherized with suitable reactants such as dimethyl sulfate, diethyl sulfate, methylbenzene sulfonate, ethylbenzene sulfonate, propylbenzene sulfonate, or the like, to yield the corresponding ether alcohol. Other procedures are known also such as oxypropylation of the chlorohydrin followed by treatment with an alkoxide, or conversion of the glycol into an alkoxide, followed by treatment with an organic chloride, such as benzylchloride or allylchloride. It is immaterial how such ether alcohols are obtained. Having obtained such ether alcohol it is then treated with glycide or otherwise reacted so as to produce a diol or which may also be referred to for convenience as an etherized glycerol. This is shown in the following reaction:

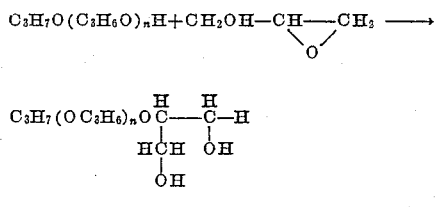

In examining the above reaction it is obvious that an isomeric mixture is obtained for reasons which are obvious in light of what is said subsequently concerning oxyethylation or oxypropylation when there is a multiplicity of recurring alkylene oxide units. Furthermore, propylene oxide being an unsymmetrical alpha-beta oxide it may have ring rupture so as to involve, at least theoretically, two different isomeric derivatives. This is true, also, in regard to glycide, i. e., at least theoretically as the two terminal hydroxyls, instead of being attached to the two carbon atoms shown, might be attached to the first and second carbon atoms and not to the third, or more correctly the branched chain carbon atom.

From what is said hereinafter it is immaterial as to which particular isomer is obtained, or if a mixture is obtained. In any event, having obtained such glycol ether or diol, or etherized glycerol, such product is then reacted with a polycarboxy acid or anhydride in the ratio of two moles of acid or anhydride for each mole of diol.

Briefly then, the present invention is concerned with a process for breaking petroleum emulsions of the water-in-oil type characterized by subjecting the emulsion to the action of a demulsifier including hydrophile synthetic products; said hydrophile synthetic products being characterized by the following formula

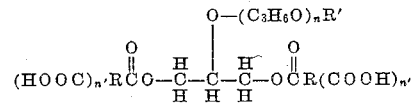

in which $n$ is a whole number varying from 15 to 80; $n'$ is a whole number not over 2; R′ is a hydrocarbon radical having less than 3 carbon atoms, and R is the radical of the polycarboxy acid

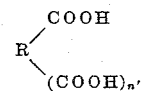

in which $n'$ has its previous significance; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group R′.

Attention is directed to the co-pending application of C. M. Blair, Jr., Serial No. 70,811, filed January 13, 1949 (now Patent No. 2,562,878 dated August 7, 1951), in which there is described, among other things, a process for breaking petroleum emulsions of the water-in-oil type characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols in which 2 moles of the dicarboxy acid ester have been reacted with one mole of a polypropylene glycol having a molecular weight, for example, of 2,000 so as to form an acidic fractional ester. Examination of what is said subsequently herein as well as the hereto appended claims in comparison with the previous example will show the line of delineation between such somewhat comparable compounds. Of greater significance, however, is what is said subsequently in regard to the structure of the parent diol as compared to polypropylene glycols whose molecular weights may vary from 1,000 to 2,000.

For convenience, what is said hereinafter may be divided into six parts:

Part 1 will be concerned with the oxypropylation derivatives of the monohydric compounds;

Part 2 will be concerned with the preparation of the diols by reacting the above-mentioned oxypropylated monohydric compounds with glycide or by other suitable means;

Part 3 is concerned with the preparation of esters from the aforementioned diols;

Part 4 is concerned with the structure of the peculiar herein described diols and their significance in light of what is said subsequently;

Part 5 is concerned with the use of the products herein described as demulsifiers for breaking water-in-oil emulsions; and Part 6 is concerned with certain derivatives which can be obtained from the diols of the type aforementioned.

In some instances such derivatives are obtained by modest oxyethylation preceding the oxypropylation step, or oxypropylation followed by oxyethylation. Similarly, modest oxypropylation could follow treatment with glycide. This results in diols having somewhat different properties which can then be reacted with the same polycarboxy acids or anhydrides described in Part 3 to give effective demulsifying agents. For this reason a description of the apparatus makes casual mention of oxyethylation. For the same reason there is brief mention of the use of glycide.

PART 1

Previous reference has been made to the use of certain monohydric compounds as initial raw materials. Examples are aliphatic alcohols such as methyl, ethyl, butyl alcohol, and the like. Some of these monohydric compounds are obtainable commercially after treatment with propylene oxide, for example. Reference is made to glycol ethers obtained by treating methyl, ethyl or isopropyl and normal butyl alcohol with 1, 2 or 3, or more moles of propylene oxide. Needless to say, these products are equally satisfactory as starting materials and it simply means that the oxypropylation step is shortened.

For that matter similar materials are obtainable commercially such as certain low molal methoxy polyethyleneglycols as illustrated by ethylene glycol monomethyl ether, ethylene glycol monoethyl ether, ethylene glycol monobutyl ether, ethylene glycol ethylbutyl ether, ethylene glycol monophenyl ether, ethylene glycol monobenzyl ether, diethylene glycol monomethyl ether, diethylene glycol monoethyl ether, or diethylene glycol monobutyl ether.

Similarly, products could be obtained from butylene oxide except for the expense of this reagent or from a mixture of ethylene and propylene oxide. Obviously there is a limit to the amount of ethylene oxide that can be present for the reason that the monohydric compound on oxypropylation should become water-insoluble at an actual molecular weight range of 1,000 to 2,000, and in many instances at less than 1,000. Likewise, it is preferable that the compound become kerosene-soluble at an actual molecular weight range of 1,000 on up. The presence of more than a few ethylene oxide radicals, of course, prevents water-insolubility and prevents kerosene-solubility. The number present can vary, of course, with the terminal group and a degree of oxypropylation but in most cases would be comparatively small, i. e., less than 10 per molecule. In most cases, however, one might as well start with the initial monohydric material and subject it to oxypropylation.

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature–low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure–low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide.

This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale raplicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds with a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4, or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The monohydric compound employed was isopropyl alcohol which was substantially anhydrous. In the initial oxypropylation this material was reacted with propylene oxide in the ratio of 20 moles of propylene oxide for one mole of the alcohol. The autoclave employed had a capacity of 15 gallons or about 120 pounds of reaction mass. The speed of the stirrer could be varied from 150 to 350 R. P. M. 3 pounds of isopropyl alcohol was charged into the autoclave along with 0.3 pound of sodium hydroxide. The reaction pot was flushed out with nitrogen. The autoclave was sealed and the automatic devices adjusted and set for injecting 58 pounds of propylene oxide in 7 hours with an allowance of another hour for stirring to insure completeness of reaction. The pressure regulator was set for a maximum of 35 pounds per square inch. This meant that the bulk of the reaction could take place, and probably did take place, at a comparatively lower pressure. This comparatively low pressure was the result of the fact that considerable catalyst was present. The propylene oxide was added at the rate of about 8 pounds per hour. More important, the selected temperature range was 205° to 215° F. (about the boiling point of water). The initial introduction of propylene oxide was not started until the heating devices had raised the temperature to about the boiling point of water. At the completion of the reaction the molecular weight, based on a hydroxyl value determination, was 723 compared with a theoretical molecular weight of 1220.

The final product was water-soluble or dispersible in xylene but not soluble in kerosene, or at least the bulk of the compound was not soluble in kerosene.

This batch of 61 pounds, except for a small amount withdrawn as a sample, was divided into 5 equal portions and subsequently subjected to further oxypropylation as described in Examples 2a to 6a, inclusive.

*Example 2a*

In this instance a 5-gallon autoclave was used instead of a 15-gallon autoclave. The equipment and design of the 5-gallon autoclave was the same as that of the 15-gallon autoclave.

The same procedure was employed as in Example 1a, preceding, except that the initial reactant was 12.2 pounds of the oxypropylated derivative described as Example 1a, preceding. To this mixture there was added 4 ounces of caustic soda. The time period was approximately 1½ hours with an added 45 minutes for stirring. The amount of oxide added was 11.6 pounds.

The molecular weight, based on hydroxyl value, was 1060, compared with a theoretical molecular weight of 2380.

The conditions of temperature and pressure were substantially the same as in Example 1a, preceding. The product was water-insoluble, xylene-soluble and kerosene-soluble. This statement applies also to the next four examples and will not be repeated.

Incidentally, the appearance of all these products varied from rather viscous, colorless or straw-colored compounds, to others having an amber tint. Those of the highest molecular weight would hardly flow at ordinary temperature or at least were rather viscous. For convenience, I have stored samples in wide-mouth cans. This applies to all the various samples herein described and this statement will not be repeated.

Also, what is said in regard to color and viscosity applies to the examples after treatment with glycide as described in Part 2.

*Example 3a*

The same procedure was followed as in Example 2a, preceding, i. e., the initial charge was 12.2 pounds of the product identified as Example 1a, preceding. The amount of propylene oxide added was 32.2 pounds. The amount of alkaline catalyst added was 6 ounces. The oxypropylation in this particular instance and in the remaining three examples, was conducted in the 20-gallon autoclave. The time period was 4 hours for the addition of the propylene oxide and the product was stirred for one hour after completion of the reaction. The final product showed a molecular weight, based on hydroxyl value, of 1570 compared with a theoretical molecular weight of 3540. The conditions of temperature and pressure were all the same as in the previous examples and, as a matter of fact, apply to all the subsequent examples in this series, i. e., Examples 4a through 6a, so this information will not be repeated.

Example 4a

The initial reactant was the same as in the two preceding examples, Examples 2a and 3a, i. e., 12.2 pounds of the product identified as Example 1a, preceding. The amount of propylene oxide added was 34 pounds. The amount of alkaline catalyst employed was 9 ounces. The time required to add the propylene oxide was 4½ hours with an allowance of 1½ hours for stirring to insure completion of reaction.

The molecular weight, based on hydroxyl number determination was 1813 compared with a theoretical molecular weight of 4700.

Example 5a

The same procedure was followed as in Examples 2a, 3a and 4a, preceding. The initial reactant was 12.2 pounds of the material previously identified as Example 1a. The amount of propylene oxide added was 46.4 pounds. The amount of catalyst added was 12 ounces of caustic soda. The time period for introduction of the oxide was 6½ hours and the reaction mass was stirred for another hour to insure completion of reaction.

The final product showed a molecular weight based on hydroxyl number of 2200 compared with a theoretical molecular weight of 5860.

Example 6a

The same procedure was followed as in Example 5a, preceding. The initial reactant was 12.2 pounds of the product identified as Example 1a, preceding. The amount of propylene oxide added was 58 pounds. The amount of catalyst was one pound of caustic soda. The propylene oxide was added in a 7½ hour period with 2 hours added for stirring to insure completeness of reaction. The molecular weight of the product, based on a hydroxyl value determination, was 2460, and based on a theoretical molecular weight it was 7020.

The same procedure was employed in connection with other monohydric compounds, such as N-butanol and N-hexanol. The characteristics of the products were the same except that there may have been a slight difference in that in the first state the product showed a trifle less water-solubility and a little greater xylene-solubility than in Example 1a.

Particular reference is made to comparable Example 7a derived from butanol and Example 13a derived from hexanol, as noted in following Table I. Table I includes data in regard to Examples 1a through 6a, and also Examples 7a through 12a derived from N-butanol and Examples 13a through 18a derived from N-hexanol.

In the following table all examples were conducted in exactly the same molal ratio as in the first series, the only difference being as follows: In the case of butanol the initial reaction involves 3.7 pounds of butanol instead of 3 pounds as in the case of isopropanol. The initial reaction mass was broken into five parts of approximately 12.4 pounds each instead of 12.2 pounds as in the series above described. The amount of oxide added, the amount of catalyst added, the time factor, temperature factor, pressure factor, etc., were all substantially identical within ability to repeat two series as in the case of Examples 1a through 6a.

The same slight modification applies to Examples 13a through 18a. In other words 5.1 pounds of hexanol were employed instead of 3 pounds of isopropanol. Similarly, this initial oxypropylation was broken into five parts of approximately 12.6 pounds each which was employed instead of the 12.2 pounds in the first series, and 12.4 pounds in the second series. Here again all the conditions of oxypropylation were substantially the same as in series 1a through 6a.

TABLE 1

| Example No. | Initial Monohydric Compound | Theoretical Weight | Molecular Weight Based on Hydroxyl Value |
|---|---|---|---|
| 1a | Isopropanol | 1,220 | 723 |
| 2a | do | 2,380 | 1,060 |
| 3a | do | 3,540 | 1,570 |
| 4a | do | 4,700 | 1,813 |
| 5a | do | 5,860 | 2,200 |
| 6a | do | 7,020 | 2,460 |
| 7a | N-butanol | 1,234 | 695 |
| 8a | do | 2,394 | 1,010 |
| 9a | do | 3,554 | 1,423 |
| 10a | do | 4,714 | 1,740 |
| 11a | do | 4,874 | 2,050 |
| 12a | do | 7,034 | 2,210 |
| 13a | N-hexanol | 1,262 | 736 |
| 14a | do | 2,422 | 1,050 |
| 15a | do | 3,582 | 1,510 |
| 16a | do | 4,742 | 1,620 |
| 17a | do | 4,902 | 1,755 |
| 18a | do | 7,062 | 1,985 |

Although caustic soda was used in the above oxypropylation needless to say any other suitable catalyst, such as sodium methylate, caustic potash, or the like, could have been employed equally satisfactorily.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 1,000 or 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 3 the stoichiometrical amount of acid of acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously stated, the oxypropylated monohydric compounds of comparatively high molecular weight (usually in excess of 1,000 based on hydroxyl value) are converted into diols by reaction with glycide mole for mole. Needless to say, other reactions can be employed which do not involve glycide, for example, one can produce ethers of the kind herein employed by use of a glycerol monochlorohydrin, i. e., either alpha or beta glycerol monochlorohydrin. Attention is directed again to the fact that in the previous formula and in the formulas in the claims it would be immaterial whether the free hydroxyl radicals prior to esterification are present as attached to the first and third terminal carbon atoms, or second and third carbon atoms. This is simply an isomeric difference depending on how the epoxy ring is ruptured in the case of glycide, or whether one employs glycerol alpha monochlorohydrin or glycerol beta monochlorohydrin. Other suitable procedure involves the use of epichlorohydrin in a conventional manner. For instance, the oxypropylated compound can be treated with epichlorohydrin and the resultant product treated with caustic soda so as to reform the epoxy ring. The epoxide so obtained can then be treated with water so as to yield a compound having two hydroxyl radicals attached to two of the three terminally adjacent carbon atoms.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,370, dated March 7, 1950, to De Groote and Keiser, and offered for sale by numerous laboratory supply houses. If such arrangement is used to prepare laboratory-scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in Part 1; but in any event, when the initial amount of glycide is added to a suitable reactant, such as Examples 2a through 6a, preceding, the speed of reaction should be controlled by the usual factors, such as (a) the addition of glycide; (b) the elimination of external heat; and (c) the use of cooling coil so there is no undue rise in temperature. All the foregoing is merely conventional but is included due to the hazard in handling glycide.

*Example 1b*

The equipment used was the glass resin pot of the kind described above. Into this resin pot were charged 145 grams of the product identified as Example 1a, preceding. To it there was added 1% sodium methylate. There was additional alkaline catalyst present due to the caustic used in the preceding oxypropylation. The temperature of the reaction mass was heated to about 120° C. 15 grams of glycide was added in a period of a little over an hour. Whenever the temperature tended to rise past 130° C. the reaction mass was cooled. If the temperature showed a tendency to drop below 112° to 115° the reaction mass was heated. When all the glycide had been added the reaction mass was stirred for approximately an hour longer at 130° C. and then heated to a temperature below the decomposition point of glycide, for instance, 140° C., and held at this temperature for another hour. In this particular reaction there is less hazard than is usually the case insofar that the amount of glycide added was comparatively small. Even so, such oxyalkylation should be conducted with extreme care.

These data and similar data are summarized in the following table.

TABLE 2

| Ex. No. of Diol | Ex. No. Monohydric Compound | Mol. Wt. of Monohyd. Cmpd. based on Hydroxyl Value | Amt. of Monohydric Compound Used (grs.) | Glycide Amt. (grs.) | Mol. Wt. of Diol Obtained, Calculated From Column 3 |
|---|---|---|---|---|---|
| 1b | 1a | 723 | 145 | 15 | 797 |
| 2b | 2a | 1,060 | 212 | 15 | 1,134 |
| 3b | 3a | 1,570 | 262 | 12.5 | 1,644 |
| 4b | 4a | 1,813 | 181 | 7.5 | 1,887 |
| 5b | 5a | 2,200 | 220 | 7.5 | 2,274 |
| 6b | 6a | 2,460 | 246 | 7.5 | 2,534 |
| 7b | 7a | 695 | 139 | 15 | 769 |
| 8b | 8a | 1,010 | 202 | 15 | 1,084 |
| 9b | 9a | 1,423 | 237 | 125 | 1,497 |
| 10b | 10a | 1,740 | 174 | 7.5 | 1,814 |
| 11b | 11a | 2,050 | 205 | 7.5 | 2,124 |
| 12b | 12a | 2,210 | 221 | 7.5 | 2,284 |
| 13b | 13a | 736 | 147 | 15 | 810 |
| 14b | 14a | 1,050 | 210 | 15 | 1,124 |
| 15b | 15a | 1,510 | 252 | 12.5 | 1,584 |
| 16b | 16a | 1,620 | 162 | 7.5 | 1,694 |
| 17b | 17a | 1,755 | 175 | 7.5 | 1,829 |
| 18b | 18a | 1,985 | 199 | 7.5 | 2,059 |

PART 3

As previously pointed out the present invention is concerned with acidic esters obtained from the diols described in Part 2, preceding, said diols being in turn obtained from oxypropylated monohydric derivatives obtained as described in Part 1, preceding. Said esters, and more particularly acidic esters, are obtained from various polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Grotte and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 3.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene, decalin, petroleum solvent, or the like, so that one has obtained approximately a 65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 2, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in all instances, is a mixture of 7 volumes of the aromatic petroleum solvent previously described and 3 volumes of benzene. This was used, or a similar mixture, in the manner previously described. In a large number of similar examples decalin has been used but it is my preference to use the above mentioned mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 3 and 4, are self-explanatory, and very complete and it is believed no further elaboration is necessary:

TABLE 3

| Ex. No. of Acid Ester | Ex. No. of Hydroxy Compound | Mol. Wt. of Hydroxy Cmpd. by OH Determ. | Amount Hydroxy Compound Used (grs.) | Polycarboxy Reactant | Amt. Used (grs.) |
|---|---|---|---|---|---|
| 1c | 1b | 723 | 241 | Phthalic Anhydride | 99 |
| 2c | 1b | 723 | 241 | Maleic Anhydride | 66 |
| 3c | 1b | 723 | 241 | Citraconic Anhydride | 75 |
| 4c | 1b | 723 | 241 | Succinic Anhydride | 67 |
| 5c | 1b | 723 | 241 | Diglycollic Acid | 89 |
| 6c | 1b | 723 | 241 | Aconitic Acid | 116 |
| 7c | 2b | 1,060 | 265 | Phthalic Anhydride | 74 |
| 8c | 2b | 1,060 | 265 | Maleic Anhydride | 49 |
| 9c | 2b | 1,060 | 265 | Citraconic Anhydride | 56 |
| 10c | 2b | 1,060 | 265 | Succinic Anhydride | 50 |
| 11c | 2b | 1,060 | 265 | Diglycollic Acid | 67 |
| 12c | 2b | 1,060 | 265 | Aconitic Acid | 87 |
| 13c | 3b | 1,570 | 314 | Phthalic Anhydride | 59 |
| 14c | 3b | 1,570 | 314 | Maleic Anhydride | 39 |
| 15c | 3b | 1,570 | 314 | Citraconic Anhydride | 45 |
| 16c | 3b | 1,570 | 314 | Succinic Anhydride | 40 |
| 17c | 3b | 1,570 | 314 | Diglycollic Acid | 54 |
| 18c | 3b | 1,570 | 314 | Aconitic Acid | 70 |
| 19c | 4b | 1,813 | 302 | Phthalic Anhydride | 49 |
| 20c | 4b | 1,813 | 302 | Maleic Anhydride | 33 |
| 21c | 4b | 1,813 | 302 | Citraconic Anhydride | 37 |
| 22c | 4b | 1,813 | 302 | Succinic Anhydride | 33 |
| 23c | 4b | 1,813 | 302 | Diglycollic Acid | 45 |
| 24c | 4b | 1,813 | 302 | Aconitic Acid | 58 |
| 25c | 5b | 2,220 | 317 | Phthalic Anhydride | 42 |
| 26c | 5b | 2,220 | 317 | Maleic Anhydride | 28 |
| 27c | 5b | 2,220 | 317 | Citraconic Anhydride | 32 |
| 28c | 5b | 2,220 | 317 | Succinic Anhydride | 29 |
| 29c | 5b | 2,220 | 317 | Diglycollic Acid | 38 |
| 30c | 5b | 2,220 | 317 | Aconitic Acid | 50 |
| 31c | 6b | 2,460 | 246 | Phthalic Anhydride | 30 |
| 32c | 6b | 2,460 | 246 | Maleic Anhydride | 20 |
| 33c | 6b | 2,460 | 246 | Citraconic Anhydride | 22 |
| 34c | 6b | 2,460 | 246 | Succinic Anhydride | 20 |
| 35c | 6b | 2,460 | 246 | Diglycollic Acid | 27 |
| 36c | 6b | 2,460 | 246 | Aconitic Acid | 35 |
| 37c | 11b | 2,050 | 205 | Phthalic Anhydride | 30 |
| 38c | 11b | 2,050 | 205 | Maleic Anhydride | 20 |
| 39c | 11b | 2,050 | 205 | Citraconic Anhydride | 22 |
| 40c | 11b | 2,050 | 205 | Succinic Anhydride | 20 |
| 41c | 11b | 2,050 | 205 | Diglycollic Acid | 27 |
| 42c | 11b | 2,050 | 205 | Aconitic Acid | 35 |
| 43c | 12b | 2,210 | 221 | Phthalic Anhydride | 30 |
| 44c | 12b | 2,210 | 221 | Maleic Anhydride | 20 |
| 45c | 12b | 2,210 | 221 | Citraconic Anhydride | 22 |
| 46c | 12b | 2,210 | 221 | Succinic Anhydride | 20 |
| 47c | 12b | 2,210 | 221 | Diglycollic Acid | 27 |
| 48c | 12b | 2,210 | 221 | Aconitic Acid | 35 |
| 49c | 17b | 1,755 | 176 | Phthalic Anhydride | 49 |
| 50c | 17b | 1,755 | 176 | Maleic Anhydride | 33 |
| 51c | 17b | 1,755 | 176 | Citraconic Anhydride | 37 |
| 52c | 17b | 1,755 | 176 | Succinic Anhydride | 33 |
| 53c | 17b | 1,755 | 176 | Diglycollic Acid | 45 |
| 54c | 17b | 1,755 | 176 | Aconitic Acid | 58 |
| 55c | 18b | 1,985 | 199 | Phthalic Anhydride | 49 |
| 56c | 18b | 1,985 | 199 | Maleic Anhydride | 33 |
| 57c | 18b | 1,985 | 199 | Citraconic Anhydride | 37 |
| 58c | 18b | 1,985 | 199 | Succinic Anhydride | 33 |
| 59c | 18b | 1,985 | 199 | Diglycollic Acid | 45 |
| 60c | 18b | 1,985 | 199 | Aconitic Acid | 58 |

TABLE 4

| Example No. of Ester | Solvent | Amt. Solvent (grs.) | Esterification Temp., °C. | Time of Esterification (hrs.) | Water Out (cc.) |
|---|---|---|---|---|---|
| 1c | #7-3 | 240 | 145 | 1½ | None. |
| 2c | #7-3 | 273 | 160 | 2 | Do. |
| 3c | #7-3 | 260 | 150 | 2½ | Do. |
| 4c | #7-3 | 242 | 145 | 1¾ | Do. |
| 5c | #7-3 | 234 | 148 | 3¼ | 9.8. |
| 6c | #7-3 | 266 | 150 | 5½ | 11.2. |
| 7c | #7-3 | 253 | 160 | 1¾ | None. |
| 8c | #7-3 | 280 | 145 | 2¼ | Do. |
| 9c | #7-3 | 245 | 160 | 2 | Do. |
| 10c | #7-3 | 270 | 150 | 2¾ | Do. |
| 11c | #7-3 | 265 | 145 | 5 | 8.8. |
| 12c | #7-3 | 245 | 158 | 3¼ | 7.8. |
| 13c | #7-3 | 235 | 145 | 2¾ | None. |
| 14c | #7-3 | 240 | 145 | 2½ | Do. |
| 15c | #7-3 | 245 | 150 | 2 | Do. |
| 16c | #7-3 | 260 | 140 | 3 | Do. |
| 17c | #7-3 | 275 | 150 | 4¼ | 7.0. |
| 18c | #7-3 | 250 | 160 | 5 | 7.3. |
| 19c | #7-3 | 235 | 148 | 1¾ | None. |
| 20c | #7-3 | 240 | 145 | 3 | Do. |
| 21c | #7-3 | 248 | 150 | 2¾ | Do. |
| 22c | #7-3 | 265 | 160 | 2½ | Do. |
| 23c | #7-3 | 250 | 155 | 4¾ | 5.6. |
| 24c | #7-3 | 235 | 145 | 5 | 5.0. |
| 25c | #7-3 | 235 | 145 | 1½ | None. |
| 26c | #7-3 | 245 | 146 | 2½ | Do. |
| 27c | #7-3 | 280 | 150 | 3 | Do. |
| 28c | #7-3 | 270 | 156 | 2¾ | Do. |
| 29c | #7-3 | 250 | 146 | 4¾ | 5.0. |
| 30c | #7-3 | 230 | 144 | 5 | 4.3. |
| 31c | #7-3 | 285 | 160 | 3 | None. |
| 32c | #7-3 | 260 | 150 | 2 | Do. |
| 33c | #7-3 | 288 | 162 | 3 | Do. |
| 34c | #7-3 | 270 | 158 | 1¾ | Do. |
| 35c | #7-3 | 275 | 148 | 3¼ | 3.5. |
| 36c | #7-3 | 240 | 147 | 4¼ | 3.0. |
| 37c | #7-3 | 235 | 142 | 1¾ | None. |
| 38c | #7-3 | 270 | 160 | 3 | Do. |
| 39c | #7-3 | 268 | 155 | 3¼ | Do. |
| 40c | #7-3 | 255 | 145 | 2¾ | Do. |
| 41c | #7-3 | 263 | 148 | 5 | 3.0. |
| 42c | #7-3 | 250 | 146 | 3½ | 2.9. |
| 43c | #7-3 | 233 | 144 | 1½ | None. |
| 44c | #7-3 | 276 | 160 | 2 | Do. |
| 45c | #7-3 | 242 | 148 | 2½ | Do. |
| 46c | #7-3 | 280 | 158 | 3 | Do. |
| 47c | #7-3 | 267 | 161 | 3¾ | 2.8. |
| 48c | #7-3 | 262 | 160 | 5 | 2.7. |
| 49c | #7-3 | 260 | 154 | 2 | None. |
| 50c | #7-3 | 245 | 146 | 1¾ | Do. |
| 51c | #7-3 | 285 | 160 | 3 | Do. |
| 52c | #7-3 | 270 | 158 | 2½ | Do. |
| 53c | #7-3 | 240 | 145 | 4¾ | 6.5. |
| 54c | #7-3 | 265 | 150 | 4½ | 7.0. |
| 55c | #7-3 | 235 | 145 | 1½ | None. |
| 56c | #7-3 | 266 | 158 | 2¾ | Do. |
| 57c | #7-3 | 275 | 158 | 3 | Do. |
| 58c | #7-3 | 250 | 160 | 2½ | Do. |
| 59c | #7-3 | 248 | 156 | 3¾ | 5.1. |
| 60c | #7-3 | 275 | 162 | 5 | 4.9. |

The procedure for manufacturing the esters has been illustrated by preceding examples. If for any reason reaction does not take place in a manner that is acceptable, attention should be directed to the following details: (a) recheck the hydroxyl or acetyl value of the oxypropylated glycerol ether and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an approximately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearances of the final products are much the same as the diols before esterification and in some instances were somewhat darker in color and had a reddish cast and perhaps somewhat more viscous.

PART 4

Previous reference has been made to the fact that diols such as polypropyleneglycol of approximately 2,000 molecular weight, for example, have been esterified with dicarboxy acids and employed as demulsifying agents. On first examination the difference between the herein described products and such comparable products appears to be rather insignificant. In fact, the difference is such that it fails to explain the fact that compounds of the kind herein described may be, and frequently are, 10%, 15% or 20% better on a quantitative basis than the simpler compound previously described, and demulsify faster and given cleaner oil in many instances. The method of making such comparative tests has been described in a booklet entitled "Treating Oil Field Emulsions," used in the Vocational Training Course, Petroleum Industry Series, of the American Petroleum Institute.

The difference, of course, does not reside in the carboxy acid but in the diol. Momentarily an effort will be made to emphasize certain things in regard to the structure of a polypropylene glycol, such as polypropylene glycol of a 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least the monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949 (now Patent No. 2,549,434 dated April 17, 1951).

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to the monohydric initial reactant is 15 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

However, in the instant situation it is obvious that there is a distinct difference of structure between the initial diol subjected to reaction with polycarboxy acids and an ordinary polypropyleneglycol such as polypropyleneglycol 2000. In the case of the last mentioned compound the two hydroxyls are in the alpha-omega position to each other, i. e., attached to opposite terminal carbon radicals and obviously there is no terminal radical such as R'. Stated another way, looking upon the ordinary glycol molecule as having two branches extended from a center or central part of the molecule in the present instance, i. e., the reactant herein employed as initial raw material, one has three branches of the molecule; i. e., the two hydroxy radicals and the terminal radical designated as R'. Furthermore, in the case of the instant diol instead of the hydroxyl radicals being in an alpha-omega position to each other they are terminally attached to two of the three terminally adjacent carbon atoms, being the terminal group opposite R', and thus present entirely a different molecular form or molecular architecture.

All of this has been pointed out previously in the formulas which illustrate the herein specified demulsifying agents.

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 35c with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier.

PART 6

Previous reference has been made to other oxyalkylating agents other than propylene oxide, such as ethylene oxide. Obviously variants can be prepared which do not depart from what is said herein but do produce modifications. The diol derived by etherization of glycerol in the manner described can be prepared from monohydric compounds which have been reacted with ethylene oxide in modest amounts and then subjected to oxypropylation provided that the resultant derivative is (a) water-insoluble, (b) kerosene-soluble, and (c) has present 15 to 80 alkylene oxide radicals. Needless to say, in order to have water-insolubility and kerosene-solubility the large majority must be propylene oxide. Other variants suggest themselves as, for example, replacing propylene oxide by butylene oxide.

More specifically then one mole of such etherized glycerol of the kind described can be prepared from one mole of a monohydric compound which has been treated with 2, 4 or 6 moles of ethylene oxide and then treated with propylene oxide so as to produce a water-insoluble, kerosene-soluble diol in which there are present 15 to 80 oxide radicals as previously specified. Similarly the propylene oxide can be added first and then the ethylene oxide, or random oxyalkylation can be employed using a mixture of the two oxides. The compounds so obtained are readily esterified in the same manner as described in Part 3, preceding. Incidentally, the diols described in Part 2 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound insofar that they are effective and valuable demulsifying agents for resolution of water-in-oil emulsions as found in the petroleum industry, as break inducers in doctor treatment of sour crude, etc.

Having thus described my invention, what I claim as new and desire to secure by Letters Patent, is

1. A process for breaking petroleum emulsions of the water-in-oil type characterized by subjecting the emulsion to the action of a demulsifier including hydrophile synthetic products; said hydrophile synthetic products being characterized by the following formula:

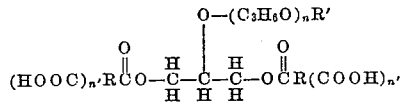

in which $n$ is a whole number varying from 15 to 80; $n'$ is a whole number not over 2; R' is a hydrocarbon radical having less than 8 carbon atoms, and R is the radical of the polycarboxy acid

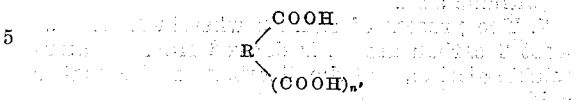

in which $n'$ has its previous significance; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group R'.

2. A process for breaking petroleum emulsions of the water-in-oil type characterized by subjecting the emulsion to the action of a demulsifier including hydrophile synthetic products; said hydrophile synthetic products being characterized by the following formula:

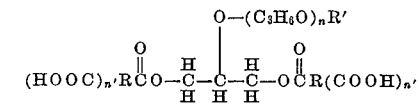

in which $n$ is a whole number varying from 15 to 80; $n'$ is a whole number not over 2; R' is a hydrocarbon radical having less than 8 carbon atoms, and R is the radical of the polycarboxy acid

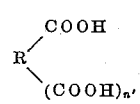

in which $n'$ has its previous significance; said polycarboxy acid having not more than 8 carbon atoms; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group R'.

3. A process for breaking petroleum emulsions of the water-in-oil type characterized by subjecting the emulsion to the action of a demulsifier including hydrophile synthetic products; said hydrophile synthetic products being characterized by the following formula:

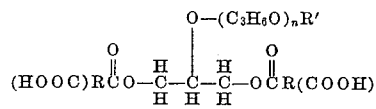

in which $n$ is a whole number varying from 15 to 80; R' is a hydrocarbon radical having less than 8 carbon atoms, and R is the radical of the dicarboxy acid

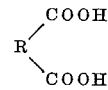

said dicarboxy acid having not more than 8 carbon atoms; with the further proviso that the parent diol prior to esterification be water-insoluble and kerosene-soluble, and furthermore that in said diol the two hydroxyl radicals be attached to two of the three adjacent carbon atoms of a terminal group opposite to the terminal group R'.

4. The process of claim 3 wherein R' has at least 3 carbon atoms.

5. The process of claim 3 wherein R' has at least 3 carbon atoms and is derived from a water-soluble alcohol.

6. The process of claim 3 wherein R' has at least 3 carbon atoms, and is derived from a water-soluble alcohol, and the dicarboxy acid is phthalic acid.

7. The process of claim 3 wherein R' has at least 3 carbon atoms, is derived from a water-soluble alcohol, and the dicarboxy acid is maleic acid.

8. The process of claim 3 wherein R' has at least 3 carbon atoms, is derived from a water-soluble alcohol, and the dicarboxy acid is succinic acid.

9. The process of claim 3 wherein R' has at least 3 carbon atoms, is derived from a water-soluble alcohol, and the dicarboxy acid is citraconic acid.

10. The process of claim 3 wherein R' has at least 3 carbon atoms, is derived from a water-soluble alcohol, and the dicarboxy acid is diglycollic acid.

MELVIN DE GROOTE.

REFERENCES CITED

The following references are of record in the file of this patent:

UNITED STATES PATENTS

| Number | Name | Date |
|---|---|---|
| 2,507,560 | De Groote et al. | May 16, 1950 |
| 2,514,399 | Kirkpatrick et al. | July 11, 1950 |
| 2,562,878 | Blair | Aug. 7, 1951 |